United States Patent Office 3,035,043
Patented May 15, 1962

3,035,043
WATER-SOLUBLE AZO DYESTUFFS CONTAINING REACTIVE GROUPS
Jakob Benz, Muenchenstein, and Lukas Schneider and Hans Siegrist, Basel, Switzerland, assignors to Sandoz Ltd., Basel, Switzerland, a Swiss firm
No Drawing. Filed Dec. 22, 1958, Ser. No. 781,910
Claims priority, application Switzerland Dec. 23, 1957
6 Claims. (Cl. 260—152)

This invention relates to water-soluble azo dyestuffs which contain at least once the reactive group

The process for producing the said dyestuffs consists in reacting 1 mole of a water-soluble organic azo dyestuff or an organic compound capable of azo dyestuff formation, the said dyestuff or compound containing at least one splittable atom or splittable atom grouping, with at least 1 mole of ethylene imine, the reaction product being subsequently converted into the azo dyestuff by suitable methods if necessary. The starting materials must be so chosen that the end products contain the number of water-solubilizing groups which is necessary for the intended application.

Examples of splittable atoms or atom groupings which may be employed in the process are halogen atoms and aryloxy groups. The halogen atoms are combined with the organic compound or the azo dyestuff, preferably as acid chlorides or acid fluorides, the splittable aryloxy groups are combined with the azo dyestuff or the organic compound in the form of carbamic acid esters. These esters react with ethylene imine in such a way that the aryloxy group is split off and replaced by ethylene imine to give an asymmetrical urea of the formula

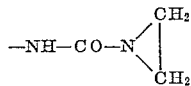

The organic compounds or azo dyestuffs used as starting materials are reacted with ethylene imine, preferably in aqueous medium. The reaction can also be conducted in an organic solvent or a mixture of organic solvent or solvents and water, this type of medium being especially suitable for reacting intermediate products that are poorly soluble or insoluble in water.

Organic solvents suitable for this purpose are alcohols, acetone, benzene, chlorobenzene, toluene, etc.

The ethylene imine can be employed in concentrated form, as an aqueous solution, or in solution in an organic solvent. Alcohols, acetone, benzene, chlorobenzene and toluene are suitable solvents.

Since the ethylene imine ring must remain intact for the dyeing process, i.e. the chemical reaction between the reactive groups of the dyestuff and the fiber the condensation, diazotization and coupling reactions are effected, under conditions as mild as possible e.g. at a temperature between 0 and 40° C. and in the pH range of 5.0 to 10.0.

When the reactants are an acid halide and ethylene imine, an equivalent amount of hydrogen halide is formed. To neutralize this acid, an acid-binding agent is added to the reaction solution either at the start or in the course of the reaction. Suitable agents are, e.g., sodium or potassium carbonate, bicarbonate or hydroxide, tertiary bases such as dimethylaminobenzene, pyridine or quinoline.

Of the organic compounds which contain an ethylene imine group and are capable of azo dyestuff formation, preference is given to those which contain a diazotizable amino group and on diazotization can be coupled, or those which contain a carbon atom capable of azo coupling and can be reacted with diazo compounds. Naturally, the organic starting compounds themselves may contain azo groups.

In order to confer sufficient water-solubility on the new dyestuffs, the starting products as defined above must be chosen so as to ensure that the necessary number of water-solubilizing groups is present.

The new dyestuffs are suitable for dyeing, padding and printing fibers of vegetable and animal origin, fibers of regenerated cellulose, casein fibers, animalized cellulosic fibers, synthetic polyamide fibers, mixtures of these fibers, and leather.

If necessary the dyeings are subjected to an alkaline aftertreatment at moderate or high temperature and then soaped. They possess good fastness to light, washing, water, milling and perspiration.

The dyeings and prints produced with the new dyestuffs are especially valuable because the dyestuffs form a stable chemical linkage with the fiber molecule and therefore as a rule possess outstanding wet fastness properties. If the total amount of dyestuff applied does not participate in the chemical reaction with the fiber, the unreacted proportion can be removed by suitable aftertreatments such as washing and/or soaping. For this purpose synthetic detergents can be used in addition to the normal washing agents, e.g. alkylarylsulfonates, sodium lauryl sulfate, sodium lauryl-polyglycol ether sulfates, mono- and dialkylphenol-polyglycol ethers.

After application by dyeing, padding or printing methods the dyestuffs can be fixed in the same bath or in a fresh bath, if necessary after intermediate drying. If a fresh bath is used it is advisable to carry out fixation in the presence of water-soluble salts, e.g. sodium sulfate, in order to prevent partial redissolving of the dyestuff in the bath. The reaction of the dyestuff radical with the fiber takes place at high temperature, e.g. under the conditions of heat setting. The operation can be accelerated or carried out at lower temperatures when agents of acid or alkaline reaction are added to the dyebath or aftertreating bath as catalysts.

The optimum conditions for the application of the dyestuffs can vary widely according to the type of fiber. In dyeing, padding and printing of animal fibers and synthetic polyamide fibers it is preferable to apply the dyestuff or to fix it in an acid, neutral or weakly alkaline medium, e.g. in presence of acetic acid, formic acid, sulfuric acid, ammonium sulfate, lactic acid, oxalic acid, sodium acetate, sodium bicarbonate, sodium or potassium carbonate, sodium metaphosphate, trimethylamine, pyridine, quinoline, etc. Dyeing can also be carried out in presence of levelling agents, e.g. polyoxyethylated fatty amines or mixtures of the same with alkylpolyglycol ethers, in an acetic acid to neutral bath, with the addition at the end of dyeing of small amounts of an agent of alkaline reaction, e.g. ammonia, sodium bicarbonate or sodium carbonate, or compounds which react alkaline on heating, e.g. hexamethylenetetramine or urea, until the bath gives a neutral or weakly alkaline reaction. The dyed goods are then rinsed well and, if necessary, soured with a little acetic acid.

The dyeing, padding and printing of cellulosic fibers is carried out to best effect in an alkaline medium, e.g. in presence of sodium bicarbonate, sodium carbonate, sodium hydroxide, potassium hydroxide, calcium hydroxide, sodium meta-silicate, sodium borate, water-glass, trisodium phosphate, ammonia, trimethylamine, quaternary bases such as tetra-alkyl ammonium compounds etc. to preclude reduction reactions during dyeing, padding or printing, it is often an advantage to add a mild oxidizing agent such as sodium 1-nitrobenzene-3-sulfonate. As a rule dyeings on cellulosic fibers also are fixed at high temperature. Some of the dyestuffs can be applied in cold dyebaths when a sufficiently strong alkali such as sodium or potassium hydroxide or trisodium phosphate is used. After fixation, the dyed, padded or printed material is thoroughly rinsed and soaped to remove the unfixed proportion of dyestuff.

In the following examples the parts and percentages are by weight and the temperatures in degrees centigrade.

EXAMPLE 1

54.1 parts of the dyestuff which is obtained by the coupling of diazotized 2-aminonaphthalene-4.8-disulfonic acid with 1-amino-3-methylbenzene and subsequent reaction of the formed aminomonoazo dyestuff with chloroformic acid phenyl ester, are dissolved in 600 parts of water at room temperature. 10 parts of ethylene imine are dropped into the solution, which is then stirred for 30 minutes. Subsequently the dyestuff formed is salted out; the crystalline precipitate is filtered off and dried.

The new dyestuff dyes cotton, wool, fibers of regenerated cellulose and synthetic polyamide fibers in yellow shades of good fastness to light and washing.

In Table 1 below are listed further azo dyestuffs containing reactive groups, which are obtainable by reacting their phenylurethane derivatives with ethylene imine by the procedure described in the foregoing example. In the table they are characterized by the diazo component and the coupling component of the aminoazo compound upon which they are based, the coupling conditions, and the shade of their dyeings on cotton.

*Table 1*

| Ex. No. | Diazo component | Coupling conditions | Coupling component | Shade on cotton |
|---|---|---|---|---|
| 2 | 1-aminobenzene-2-sulfonic acid | Alk | 2-amino-5-hydroxy-napthalene-7-sulfonic acid. | Orange. |
| 3 | 4-amino-1,1'-azobenzene-3.4'-disulfonic acid | Alk | ----do---- | Red. |
| 4 | 1-amino-4-methylbenzene-2-sulfonic acid | Alk | ----do---- | Reddish orange. |
| 5 | 2-aminonaphthalene-4.8-disulfonic acid | Alk | ----do---- | Scarlet. |
| 6 | 1-aminobenzene-2-sulfonic acid | Alk | 3-amino-5-hydroxy-naphthalene-7-sulfonic acid | Red. |
| 7 | 2-aminonaphthalene-4.6.8-trisulfonic acid | Alk | 1(4'-amino)-phenyl-3-methyl-5-pyrazolone | Orange. |
| 8 | 1-aminobenzene-2.5-disulfonic acid | Alk | ----do---- | Yellow. |
| 9[1] | 4-amino-4'-acetylamino-diphenyl-3-sulfonic acid | Alk | 1-phenyl-3-methyl-5-pyrazolone-2'.5'-disulfonic acid | Yellow-orange. |

See footnote at end of table.

*Table I—Continued*

| Ex. No. | Diazo component | Coupling conditions | Coupling component | Shade on cotton |
|---|---|---|---|---|
| 10[1] | 4-amino-4'-acetyl-amino-2.2'-dimethyl-diphenyl-5-sulfonic acid | Alk | 1-hydroxynaphtha-3.6-disulfonic acid | Red. |
| 11[1] | 1-amino-3-acetyl-amino-benzene-6-sulfonic acid | Acid | 2-amino-8-hydroxy-naphthalene-6-sulfonic acid | Do. |

[1] On completion of coupling the acetylamino group of the diazo component is saponified to the amino group in alkaline solution.

EXAMPLE 12

28.6 parts of 1-carboxy-2-hydroxynaphthalene-6-sulfonic acid chloride are added in portions in the course of about 20 minutes to a well stirred ice-cold mixture of 40 parts of water, 10 parts of sodium bicarbonate and 8 parts of ethylene imine. Stirring is continued for 30 minutes at 0–3° to bring about complete solution, upon which the reaction mass is diluted with ice-water to 100 parts by volume. 15 parts of sodium chloride are added, causing the 1-carboxy-2-hydroxy-naphthalene-6-sulfonic acid-ethylene imide formed to be precipitated. When filtered the precipitate is a white granular filter cake which is processed further in the moist state.

The moist filter cake, which is equivalent to 31.5 parts of the sodium salt of 1-carboxy-2-hydroxynaphthalene-6-sulfonic acid ethylene imide, is stirred into an ice-cold solution of 15 parts of anhydrous sodium carbonate in 400 parts of water. To the suspension is added in 15 minutes at 0–3° with stirring an aqueous suspension of the diazo compound of 17.3 parts of 1-aminobenzene-3-sulfonic acid. After stirring for 1 hour at low temperature the new dyestuff is precipitated in crystalline form. It is filtered off, washed free of alkali, and dried in vacuo at 30°.

The new dyestuff is an orange-colored powder which dyes wool, cotton and fibers of regenerated cellulose in bright orange shades of good fastness to light and washing.

EXAMPLE 13

When the 17.3 parts of 1-aminobenzene-3-sulfonic acid used as diazo component in Example 12 are replaced by 30.3 parts of 2-aminonaphthalene-4.8-disulfonic acid, or by 35.7 parts of 4-amino-1.1'-azobenzene-3.4'-disulfonic acid, dyestuffs are obtained which possess equally good fastness properties and dye cotton in red-orange or red shades respectively.

EXAMPLE 14

55 parts of the monoazo dyestuff obtained by alkaline coupling of the diazo compound of 17.5 parts of 1-aminobenzene-3-sulfonic acid fluoride with 40 parts of 1-hydroxy-3-acetylaminonaphthalene-3.6-disulfonic acid, are dissolved in 500 parts of water. 10 parts of ethylene imine are added at 15° with stirring. After stirring for 1 hour at 15–20° the dyestuff formed is precipitated, filtered off and dried in vacuo at 50°.

The new dyestuff dyes cotton and fibers of regenerated cellulose in red shades of good light and washing fastness.

The following Table 2 contains further azo dyestuffs containing reactive groups which can be produced in accordance with the foregoing example by reacting the sulfonic acid fluoride groups with ethylene imine. They are characterized by the diazo and coupling components, the coupling conditions and the shade of their dyeings on cotton.

Table 2

| Ex. No. | Diazo component | Coupling conditions | Coupling component | Shade on cotton |
|---|---|---|---|---|
| 15 | 1-aminobenzene-3-sulfonic acid fluoride. | Acid | 2-amino-8-hydroxynaphthalene 3.6-disulfonic acid. | Red. |
| 16 | 1-amino-2-methylbenzene-5-sulfonic acid fluoride. | Alkaline | 1-phenyl-3-methyl-5-pyrazolone-2'.5'-disulfonic acid. | Yellow. |
| 17 | 2 mols 1-aminobenzene-4-sulfonic acid fluoride. | First acid with 1 mol diazo compound, then alkaline with 1 mol diazo compound. | 1 mol 1-amino-8-hydroxy-naphthalene-3.6-disulfonic acid. | Greenish blue. |

EXAMPLE 18

17.5 parts of 1-aminobenzene-4-sulfonic acid fluoride are dissolved in 40 parts of ethanol and added with stirring to a mixture of 6 parts of ethylene imine and 50 parts of water. At a temperature of 15–20° the pH value is maintained at 9.0 by gradual addition of about 25 parts of a 10% sodium hydroxide solution. Stirring is continued for 2 hours at 20–25°, after which the precipitated 1-aminobenzene-4-sulfonic acid ethylene imide is filtered off, washed with water until free of alkali, and dried in a vacuum desiccator over calcium chloride.

20 parts of 1-aminobenzene-4-sulfonic acid-ethylene imide are suspended in 400 parts of ice-cold water. 20 parts of 30% hydrochloric acid are added dropwise at 0–2° with stirring, followed by a solution of 7 parts of sodium nitrite in 20 parts of water. The diazo solution thus formed is filtered free of minute impurities and added in portions to an ice-cold solution of 33 parts of 1(2'.5'-dichloro-4'-sulfophenyl)-3-methyl-5-pyrazolone, 20 parts of sodium bicarbonate and 200 parts of water. The monoazo dyestuff formed is precipitated by the addition of sodium chloride, filtered off and washed free of alkali with a sodium chloride solution. It is dried in vacuo at 50° and then ground. A yellow dyestuff of good water-solubility is obtained which dyes cotton and fibers of regenerated cellulose in yellow shades of good fastness to light and washing.

Table 3 below gives details of further azo dyestuffs containing an ethylene imine ring, which can be produced according to the procedure described in the above example. The dyestuffs are characterized in the table by the diazo and coupling components and the shade of their dyeings on cotton.

Table 3

| Ex. No. | Diazo component | Coupling component | Shade on cotton |
|---|---|---|---|
| 19 | 1-amino-2-chlorobenzene-5-sulfonic acid-ethyleneimide | 1-(2'.5'-dichloro-phenyl)-3-methyl-5-pyrazolone-4'-sulfonic acid | Yellow |
| 20 | 1-aminobenzene-4-sulfonic acid ethylene-imide | 2-acetylamino-5-hydroxy-naphthalene-1.7-disulfonic acid | Orange |
| 21 | ---do--- | 2-ω-sulfoacetylamino-5-hydroxynaphthalene-7-sulfonic acid | Do. |
| 22 | ---do--- | 3-acetylamino-5-hydroxy-naphthalene-7-sulfonic acid | Scarlet. |
| 23 | ---do--- | 1-hydroxynaphthalene-3.6-disulfonic acid | Red. |
| 24 | ---do--- | 1-acetylamino-8-hydroxy-naphthalene 3.6-disulfonic acid | Do. |
| 25 | ---do--- | 1-phenyl-3-methyl-5-pyrazolone 2'.5'-disulfonic acid | Yellow |
| 26 | 1-amino-2-methyl-benzene-5-sulfonic acid ethyleneimide | 1-(2',5'-dichlorophenyl)-3-methyl-5-pyrazolone-4'-sulfonic acid | Do. |

Table 3—Continued

| Ex. No. | Diazo component | Coupling component | Shade on cotton |
|---|---|---|---|
| 27 | 1-amino-2-methylbenzene-5-sulfonic acid ethyleneimide | 1-chloro-8-hydroxy-napthalene-3.6-disulfonic acid | Red. |
| 28 | ---do--- | 2-hydroxynaphthalene-3.6-disulfonic acid | Do. |
| 29 | ---do--- | 2-hydroxynaphthalene-3.6.8-trisulfonic acid | Do. |
| 30 | 1-aminobenzene-4-sulfonic acid ethyleneimide | 1-amino-8-hydroxy-2-phenyl-azonaphthalene-3.6.4'-trisulfonic acid | Greenish blue. |
| 31 | ---do--- | 1 mol of the diazo compound of 4-amino-1.1'-acid [1] coupled with 1 mol of 1-amino-8-hydroxynaphthalene-3.6-disulfonic acid | Blue, gray. |

[1] Azobenzene-3.4'-disulfonic acid.

EXAMPLE 32

100 parts of mercerised cotton fabric are padded in a 2% aqueous neutral solution of the dyestuff of Example 14 at room temperature. The fabric is squeezed to give an increase of 100% on its dry weight and is then conveyed into a developing bath on the jig (liquor ratio 1:5) containing 300 grams per liter of sodium chloride and 10 milliliters per liter of sodium hydroxide solution of 66° Tw. It is treated in this bath for 40 minutes at 80–90° and subsequently rinsed well in cold water, soaped at the boil for 20 minutes with 5 grams per liter of soap, well rinsed, and dried. The bluish red dyeing obtained is fast to light and washing.

EXAMPLE 33

100 parts of a wool fabric are dyed in 5000 parts of a dyebath containing 2 parts of the dyestuff of Example 18 and 3 parts of glacial acetic acid. Dyeing is started at 30° and the temperature increased to 100° in 30 minutes. Subsequently the bath is neutralized with ammonium hydroxide and dyeing continued for 20 minutes at 90°. After rinsing and drying, a yellow dyeing is obtained which has good light and washing fastness.

Having thus disclosed the invention what we claim is:

1. A member selected from the group consisting of the dyes of the formulas

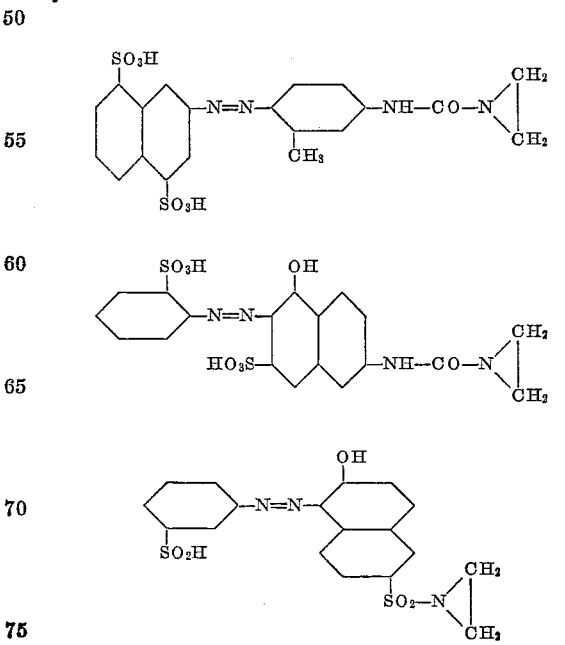

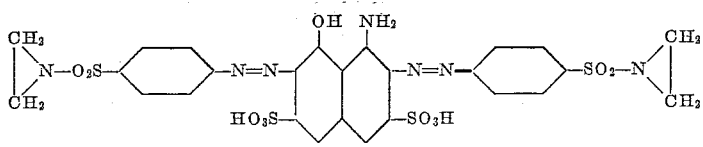
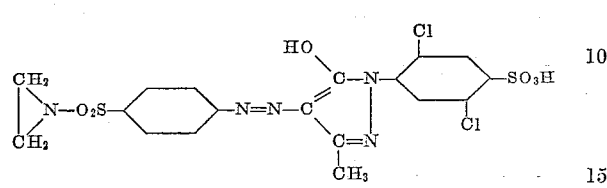
2. The dye of the formula
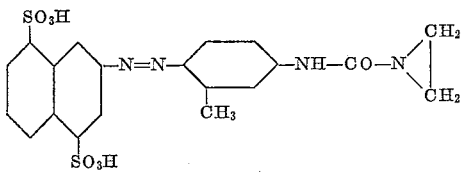
3. The dye of the formula
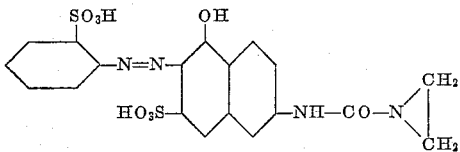
4. The dye of the formula
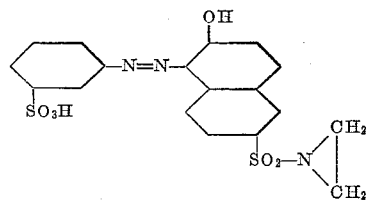
5. The dye of the formula
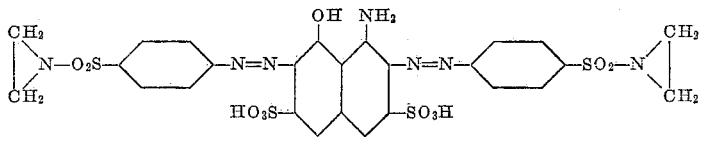
6. The dye of the formula
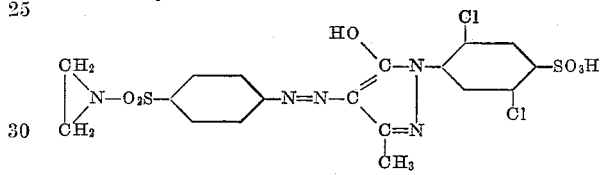
References Cited in the file of this patent
UNITED STATES PATENTS
| | | |
|---|---|---|
| 2,233,475 | Dreyfus | Mar. 4, 1941 |
| 2,819,259 | Schmid et al. | Jan. 7, 1958 |
| 2,895,785 | Alsberg et al. | July 21, 1959 |
FOREIGN PATENTS
| | | |
|---|---|---|
| 884,446 | France | Apr. 27, 1943 |
OTHER REFERENCES
Wegmann: "Textile-Praxis," October 1958, pages 1056–1058.